United States Patent [19]

Lusk

[11] 4,212,247
[45] Jul. 15, 1980

[54] TRANSIT SYSTEM

[76] Inventor: Kenneth P. Lusk, 1000 B Richmond Rd., China Lake, Calif. 93555

[21] Appl. No.: 926,831

[22] Filed: Jul. 21, 1978

[51] Int. Cl.² ............................................. B61D 13/04
[52] U.S. Cl. ................................... 104/124; 104/108; 104/118; 105/141; 105/181
[58] Field of Search ...................... 105/181, 141, 144; 104/108, 118, 119, 124, 140, 139; 301/37 P, 37 PW

[56] References Cited

U.S. PATENT DOCUMENTS

| 2,267,403 | 12/1941 | Herold | 152/323 |
| 3,669,026 | 6/1972 | Movrilzen | 105/141 |
| 3,800,707 | 4/1974 | Hermann | 295/1 |
| 3,827,369 | 8/1974 | Mueller | 104/118 |

Primary Examiner—Richard A. Bertsch
Attorney, Agent, or Firm—Gerald F. Baker

[57] ABSTRACT

A vehicle is supended on a pair of slotted rails of tubular shape. The vehicle has a plurality of support members sloping downwardly from the sides of the car and having running gear thereon engaging within the rails through the slots. The vehicle is preferably of light weight materials and provided with some form of aerodynamic means to provide lift as the vehicle passes through the air along a right of way. The running gear includes rolling friction means designed to function in any event from low speed with maximum weight to negative gravity at high speeds.

13 Claims, 2 Drawing Figures

TRANSIT SYSTEM

BACKGROUND OF THE INVENTION

1. Field of the Invention

This invention relates to transit systems and particularly to transit systems designed for urban rapid transit.

Most particularly the invention is directed toward a transportation system wherein vehicles may be operated at high speeds with comfort, safety and stability.

2. Description of the Prior Art

A transportation system has been proposed in U.S. Pat. No. 3,888,185 issued June 10, 1975, to Robert Walsh wherein a vehicle is shown suspended from hollow slotted tubular rails by means of sleds or runners slidingly disposed within the track. This system inherently allows an undesirable amount of side to side swinging movement of the vehicles and the same is provided for in the construction of the support members connecting the runners to the vehicle.

SUMMARY

According to the present invention a transit system has been provided wherein the vehicles are supported by running gear characterized by angularly positioned axle members mounted on the sides of the vehicles and protruding outwardly and down-wardly at an acute angle to the plane of symmetry through the longitudinal axis of the vehicle.

The axles terminate in running gear members which may take the form of wheels. These running gear members are captive in two continuous slotted hollow rails which are supported in a conventional manner by continuous or spaced supports. The running gear members are preferably coated with a cushioning and sound deadening layer which advantageously may be of a composition which will roll or slide easily on the inside surfaces of the hollow rails without the need for additional lubrication.

This construction allows for greater stability with minimum side swing and further allows for control of the vehicle in the event of zero or negative load on the running gear. It is thus a feature of this invention that the vehicle be such as to be light enough and have aerodynamic lifting surfaces provided to accomplish sufficient lift under normal loading and speed conditions to achieve at least zero gravity load on the running gear.

DESCRIPTION OF THE PREFERRED EMBODIMENTS

Figure 1:
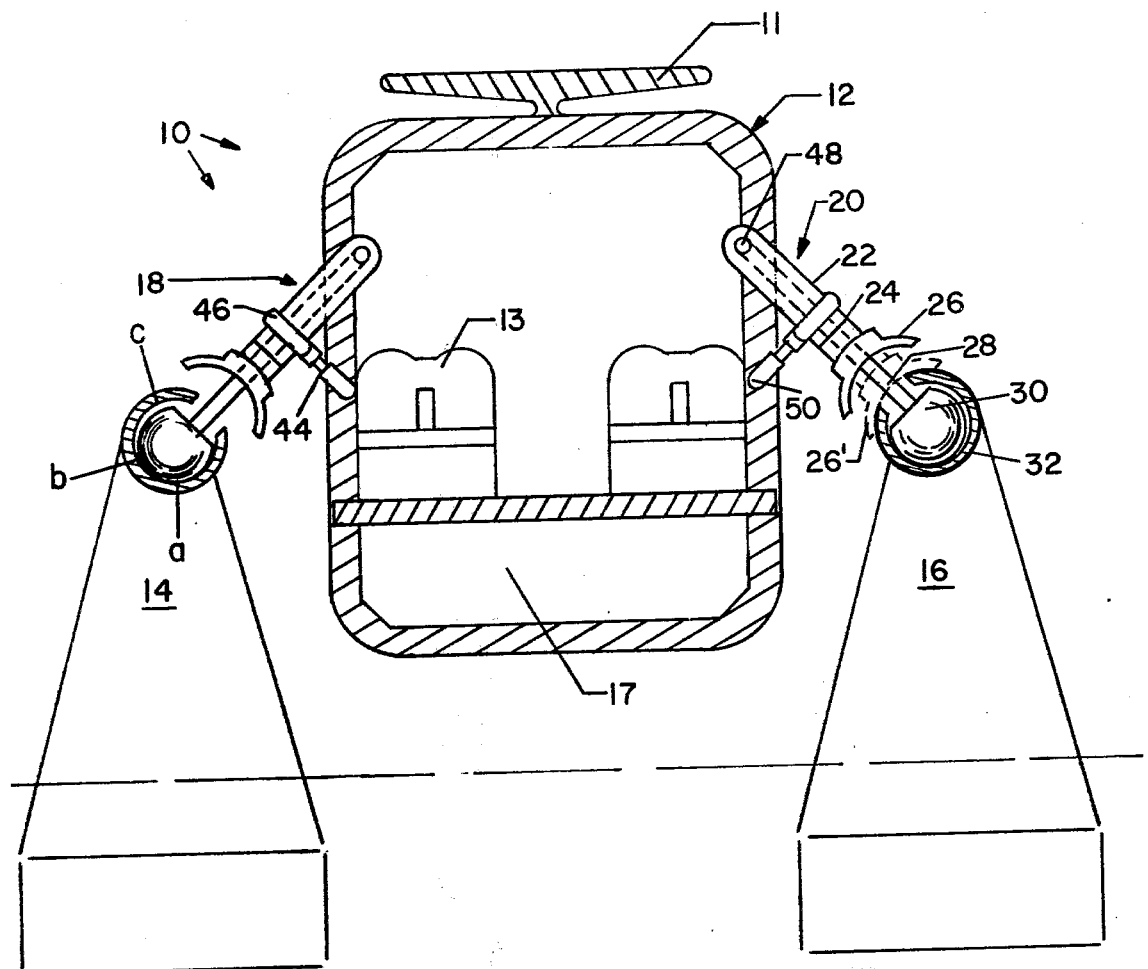
FIG. 1 is a cross sectional view through a vehicle and supporting rails taken in a plane perpendicular to the longitudinal axis of the vehicle.

Referring to FIG. 1, a portion of a transportation system 10 is shown wherein a vehicle body 12 is equipped with aerodynamic lifting surfaces exemplified by the lifting structure 11. The vehicle body shown, which may be equipped with seats 13 for passengers, is supported along a right of way by means of spaced foundation members 14, 16 as shown or may be supported by continuous structures such as the walls (not shown) of an elevated or subterranean passageway; Space 17 under the seats 13 may be be utilized for passengers' baggage as well as control cables, air conditioning ducts and the like.

The vehicle 12 is supported on the pillars 14, 16 by means of running gear 18, 20. These running gear comprise an axle housing 22 which is equipped with a brake actuator 24 for moving a brake shoe 26 from the solid line position to the dotted line position shown at 26.

Within the housing 22 is an axle 28 which carries on its outboard end a running gear member or wheel 30. The running gear member is captive within a hollow slotted tubular rail 32 and details of this running gear member are shown more particulary in FIG. 2.

The running gears are stabilized and automatically angularly positioned by hydraulic servo means 44, 46 of conventional design. The axle 28 is pivotally attached to the side of the vehicle at 48 and the servo mechanism is pivoted to the side of the vehicle at 50. The optimum angle of the running gear is about 45° from vertical.

Figure 2:
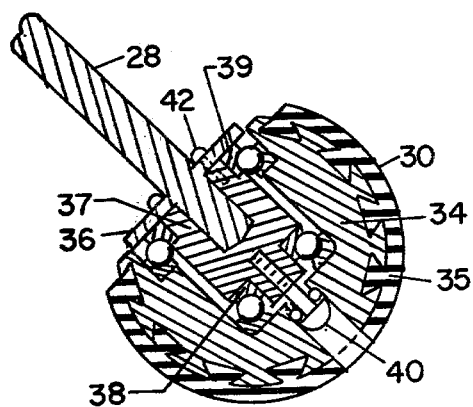
FIG. 2 is a cross sectional view of one of the running gear members of the FIG. 1 device taken on a plane through the longitudinal axis of the running gear axle.

In FIG. 2 the axle 28 is shown terminating in a running gear member or wheel 30 having a rigid inner core 34 and a flexible outer surface 35. The axle member 28 is flanged at 36 for connection to the hub 37 which carries bearings 38, 39 on which the member 30 is fastened by means of retaining screw 40. Hub 37 may be attached to axle 28 by any conventional means such as by studs 42.

Since the running gear members are captive within the tubular rails and the brakes react with the captive gear and the rails, there is no demand for vehicle weight for braking or to keep the conveyance "on the track." On the contrary it is expected that at cruising speed the vehicle will be airborne.

To this end the wheel 30 is designed to be of sufficient less outside diameter than the inside diameter of the rails so that the wheel moves within the rail from a rest or load position at point "a" as shown in FIG. 1 to point "b" at higher speeds and on side thrusts and thence to point "c" when the vehicle achieves maximum lift.

It is contemplated within the state of the art that sensor mechanisms within or in cooperation with the servo means 44, 46 will monitor the stress on said servo in proportion to the load exerted at point "a" and, as the vehicle gains speed and lifts from point "a", hydraulic forces will be brought to bear to push the running gear outwardly to cause the wheel 30 to maintain contact with the inside of the rail at about point "b". As the vehicle attains speeds in the cruising range contemplated to cause aerodynamic lift, the hydraulic servo will be effective to move the running gear so that wheel 30 contacts the rail at about point "c". At this time, rolling friction between wheel and rail will be negligible and the vehicle may, in a sense be said to be airborne.

The wheels may have a flexible composition such as a silicone plastic, nylon, silicone rubber, or the like, bonded to the surface in a manner as shown in FIG. 1 with backfaced countersunk portions over the entire periphery to retain the material on the surface and to add resiliency to the surface. This surface not only provides a long wearing anti-friction quality to the wheel but also a cushioning and sound deadening quality to the ride.

I claim:

1. A transportation system including:
   track means comprising at least two tubular track members extending along the length of a right of way to be traversed;

each track member including a longitudinal slot in one side thereof and which slot extends the entire length thereof;

means supporting said track means along said right of way;

at least one vehicle;

at least one running gear on each side of each said vehicle and extending from said vehicle at an acute, downwardly sloping angle from the vehicle to said track members;

each said running gear having an outboard end adapted to engage within one of said tubular track means through said slot therein including a running gear member having a generally circular area in orthogonal cross section slightly less than the cross sectional area of the inside of said tube and effective with the inner surfaces of said tube to provide support and guidance for said vehicle.

2. The system of claim 1:

wherein said running gear comprise an inboard end pivotally mounted on said vehicle; and servo means pivotally mounted on said vehicle and cooperating with said running gear intermediate the ends thereof to maintain proper angular positioning of said running gear.

3. The system of claim 2:

wherein said outboard end of each said running gear member comprises a wheel mounted on said end for rotation around the longitudinal axis of said running gear.

4. The system of claim 3:

wherein said wheel is spherical in contour and carries an outer coating of a flexible material.

5. The system of claim 4 wherein said flexible material is a silicone plastic.

6. The system of claim 4 wherein said flexible material is a silicone rubber.

7. The system of claim 1 wherein each said running gear member includes a flexible antifriction coating.

8. The system of claim 7 wherein said running gear member is a wheel having a spherical contour.

9. The system of claim 7 wherein said running gear comprises an inboard end pivotally mounted on said vehicle; and servo means pivotally mounted on said vehicle and cooperating with said running gear intermediate the ends thereof to maintain proper angular positioning of said running gear.

10. The system of claim 9 wherein said coating on said running gear member is a silicone polymer; and said running gear at maximum extension being at about a 45° angle from vertical.

11. The system of claim 1 wherein said running gear comprises an inboard end pivotally mounted on said vehicle.

12. The system of claim 11 including means for limiting pivotal movement of said running gear with respect to said vehicle.

13. The system of claim 12 wherein said running gear members comprise rotatably mounted spherical surfaces engaging the inner surfaces of said track members.

* * * * *